United States Patent [19]

Okada

[11] Patent Number: 4,673,990
[45] Date of Patent: Jun. 16, 1987

[54] PRINTER HAVING CONTROL MEANS FOR STOPPING THE PRINTING OPERATION THEREOF AND INHIBITING DATA OUTPUT FROM MEMORY

[75] Inventor: Kunio Okada, Kawasaki, Japan
[73] Assignee: Canon Kabushiki Kaisha, Tokyo, Japan
[21] Appl. No.: 702,889
[22] Filed: Feb. 19, 1985
[30] Foreign Application Priority Data
  Feb. 21, 1984 [JP] Japan ................ 59-29494
[51] Int. Cl.[4] .............. H04N 1/21; H04N 1/23; H04N 1/29
[52] U.S. Cl. ............... 358/296; 358/300; 355/14 C
[58] Field of Search ......... 358/296, 300; 355/14 C; 346/160

[56] References Cited

U.S. PATENT DOCUMENTS

| | | | |
|---|---|---|---|
| 4,186,299 | 1/1980 | Batchelor | 355/14 C |
| 4,291,341 | 9/1981 | Yajima | 358/300 |
| 4,445,128 | 4/1984 | Dolan et al. | 346/160 |
| 4,541,711 | 9/1985 | Takahashi | 346/160 X |
| 4,571,069 | 2/1986 | Kimura et al. | 355/14 C X |

OTHER PUBLICATIONS

Operator's Manual for Canon NP300/300F, pp. 1, 2, 3, 4, 11, 12, 61, and 62, c. Jan. 1983.

Primary Examiner—E. A. Goldberg
Assistant Examiner—Patrick W. Foster
Attorney, Agent, or Firm—Fitzpatrick, Cella, Harper & Scinto

[57] ABSTRACT

A printer has print paper feed means, print means for printing on the print paper, a memory for supplying a print data to the print means and input means for inputting a temporary stop request for the printer. When the temporary stop request is issued during the print operation, the data is continuously outputted from the memory means until the print operation to the print paper already fed is completed, thereafter outputting of further data is inhibited and the printer is stopped after the print paper has been ejected.

6 Claims, 12 Drawing Figures

PRINTER HAVING CONTROL MEANS FOR STOPPING THE PRINTING OPERATION THEREOF AND INHIBITING DATA OUTPUT FROM MEMORY

BACKGROUND OF THE INVENTION

1. Field of the Invention

The present invention relates to a printer.

2. Description of the Prior Art

A laser beam printer which utilizes an electrostatic photographic method uses a series of print processes including paper feed, latent image formation on an electrostatic drum and development thereof, transfer of the image onto a paper and fixing thereof. If the series of processes are interrupted, various troubles such as loss of the image, jamming of the paper and incomplete fixing of the toner image takes place. According, once printing is started, the printed process to the fixing of the toner image on the paper cannot be interrupted except for an emergency stop. In the prior art printers of this type, if an operator requests a temporary stop by depressing a switch, the reception process of a new print data from a data source is immediately interrupted and the acceptance of the temporary stop request is immediately displayed on an LED. Similarly, when a minor error occurs in the printer or the paper supply has been exhausted, the process of the new data is immediately interrupted and it is immediately displayed. However, since the print processes in the units which perform the series of print processes cannot be interrupted, the print processes for the print paper currently being processed are not interrupted but continued. This is rather preferably in completing the print processes which are in progress unless the printer is to be stopped immediately because of a serious trouble. Nevertheless, when the operator who saw the display of the acceptance of the temporary stop request or the minor error, immediately starts to supplement the recording media or checks the printer and opens a door of the printer cabinet, a safety device operates to forcibly stop the printer. As a result, a paper jam takes place or low quality printed materials are produced.

SUMMARY OF THE INVENTION

It is an object of the present invention to provide a highly reliable printer.

It is another object of the present ivention to provide an improved printer having a page memory.

Another object of the present invention is to provide a print system which performs a paper print interruption.

It is another object of the present invention to provide a print system which properly responds to a temporary stop request.

Another object of the present invention is to provide a print system which clearly indicates the end of printing when a convey path of the recording medium is long or a plurality of recording media are concurrently fed.

The other objects of the present invention will be apparent from the following description of the invention.

According to one aspect of the present invention, a printer has feed means for feeding a printing medium through the printer and print means for printing on the printing medium fed by the feed means. Memory means stores data and supplies the data to the print means in blocks of one page at a time. Control means, responsive to a temporary stop request, occurring during the printing operation, continues the data from the memory means for a single page from the memory means until the printing operation of the printing medium is completed. Thereafter, outputting of further data is inhibited and the printer is stopped after the printing medium is ejected.

Another aspect of the invention pertains to a printing system having printing means for printing on a printing medium. Memory means stores and supplies data to the printing means in blocks of one page at a time. Input means inputs a temporary stop request to the printing system. Display means displays time necessary to eject the printing medium after the printing operation wherein the display means cooperates with data access of the memory means.

According to still another aspect of the present invention, a printer has feed means for feeding a printing medium through the printer and print means for printing on the printing medium fed by the feed means. Memory means stores and supplies data to the printing means in blocks of one page at a time. Input means inputs a temporary stop request to the printer. Control means responsive to the temporary stop request issued by the input means during the printing operation controls the data access from the memory means wherein the control process relating to the input of a stop request for the data which accessed in the printing process is different from the data which is accessed in the reading process.

DETAILED DESCRIPTION OF THE PREFERRED EMBODIMENTS

Figure 1:
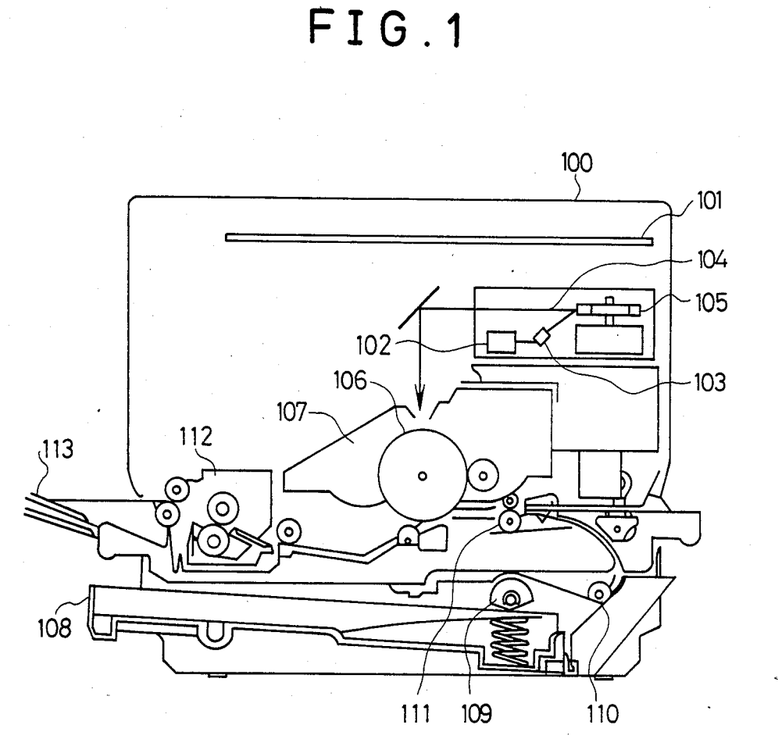
FIG. 1 is a sectional view showing an internal mechanism of a laser beam printer in accordance with one embodiment of the present invention.

FIG. 1 is a sectional view showing an internal mechanism of a laser beam printer (LBP) in accordance with one embodiment of the present invention. Numeral 100 denotes an LBP main unit which converts character information supplied from a computer (not shown) connected to the LBP to corresponding character patterns to form images on a paper which is a recording medium. Numeral 101 denotes a printer control unit which controls the LBP 100 and analyzes the character information supplied from the host computer. For example, it converts the input character information to a video signal of the corresponding character patterns and supplies it to a laser driver 102. The laser driver 102 is a control circuit for driving a semiconductor laser and controls turn-on and turn-off of a laser beam 104 emitted from the semiconductor laser 103 in accordance with the input video signal. The laser beam 104 is laterally deflected by a rotating polygon mirror 105 and directed to an electrostatic drum 106 to form a latent image of the character patterns thereon. The latent image is developed by a develop unit 107 around the electrostatic drum 106 and then transferred to a paper. The paper is a cut sheet which is accommodated in a paper cassette 108 loaded to the LBP 100 and fed into the LBP by a feed roller 109 and convey rollers 110 and 111 and fed to the electrostatic drum 106. The paper having the character patterns transferred thereon is fixed by a fixing unit 112 and then ejected to a paper ejection tray 113.

Figure 2:
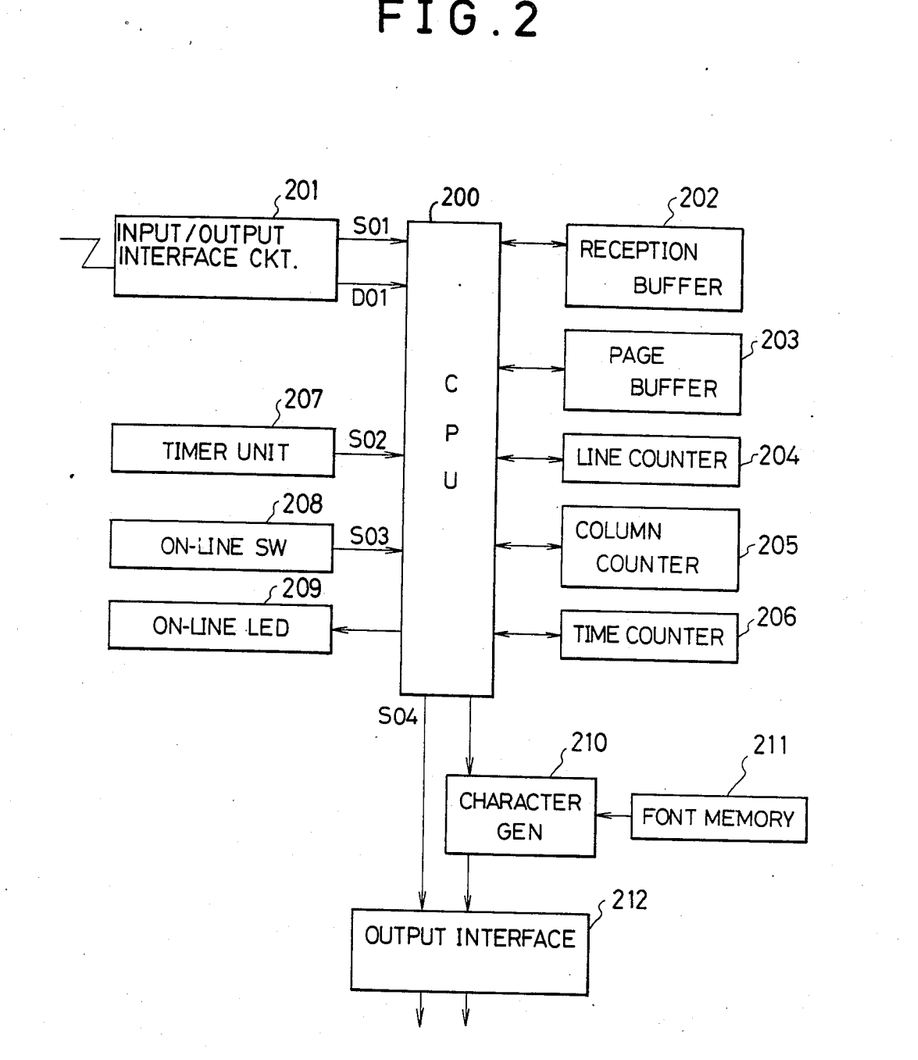
FIG. 2 is a block diagram of a printer control unit 101 of FIG. 1.

FIG. 2 is a block diagram of the printer control unit 101. Numeral 200 denotes a central processing unit (CPU) for controlling the LBP 100 and analyzing and editing the character information supplied from the host computer, and numeral 201 denotes an input/output interface circuit for transmitting and receiving data to and from the host computer. When the character information and the control instruction are supplied from the host computer, the I/O interface circuit 201 sends an interrupt signal S01 to the CPU 200 to inform the presence of such input and sends the input information signal D01 to the CPU 200. Numeral 202 denotes a reception buffer for temporarily storing the input information supplied from the host computer through the CPU 200. The CPU 200 reads in the input information D01 by an input interrupt program which is started by the interrupt signal S01 and writes it into the reception buffer 202. Numeral 203 denotes a page buffer which edits the input data by line and by digit and retains it page by page. The buffers 202 and 203 may be RAM's. Numerals 204 and 205 respectively denote a line counter and a digit counter for controlling the numbers of lines and digits of the input data. Numeral 206 denotes a time counter for counting a time required for the paper fed into the printer from the paper cassette 108 to be ejected to the paper eject tray 113. Numeral 207 denotes a timer unit which sends an interrupt signal S02 to the CPU 200 at an interval of 100 ms. A timer interrupt program to be described later is started by the interrupt signal S02. When the print operation is started, a predetermined number of 100 ms—units are set into the time counter 206 as a preset time required for a paper which has been fed into the printer to be completely ejected from the printer. The time counter 206 is decremented by one each time the timer unit 207 generates the interrupt signal so that the content of the time counter 206 reaches zero immediately after the paper has been completely ejected. The content of the time counter 206 is an index to indicate whether the LBP 100 is feeding the paper or not. Numeral 208 denotes an on-line switch which alternately commands temporary stop and restart of the LBP 100 for each depression of the switch. A signal S03 is kept on while the switch is depressed. Numeral 209 denotes an on-line LED which indicates a temporary stop/restart state of the LBP 100. Numeral 210 denotes a character generator which receives the character information supplied from the host computer, line by line, converts it to a print signal of the corresponding character patterns and supplies it to an output interface circuit 212. The character generator 210 has a font memory (ROM) 211 which contains therein a set of character patterns. The output interface circuit 212 controls transmission and reception of signals between the printer control unit 101 and the printer elements 102-113. In response to a start of print signal S04 from the CPU 200, the printer elements are started so that the paper feed, the rotation of the electrostatic drum 106 and the laser driver 102 are started.

Figure 3:
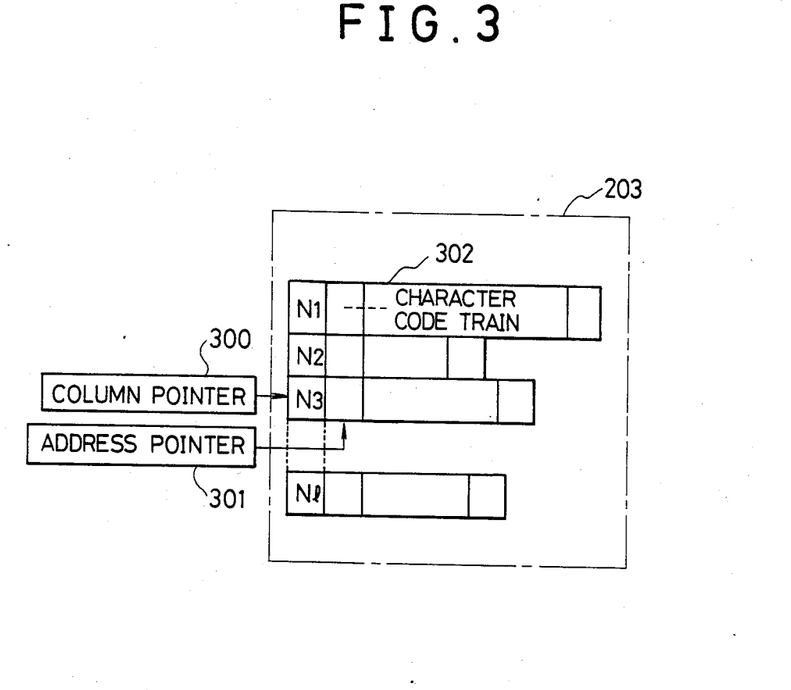
FIG. 3 shows a page buffer 203 and a function of a memory pointer.

FIG. 3 shows the page buffer 203 and a function of a memory pointer. Numeral 300 denotes a column pointer which points to a digit data storage location of each line on the page buffer 203, numeral 301 denotes an address pointer which points to a next character data storage location on the page buffer 203, and numeral 302 denotes a format of one line of the page buffer 203. Each line comprises a digit data and a character code train. A symbol $n_i$ (i=1,2,...) at the digit data storage location indicates the number of digits in the line.

Figure 4:
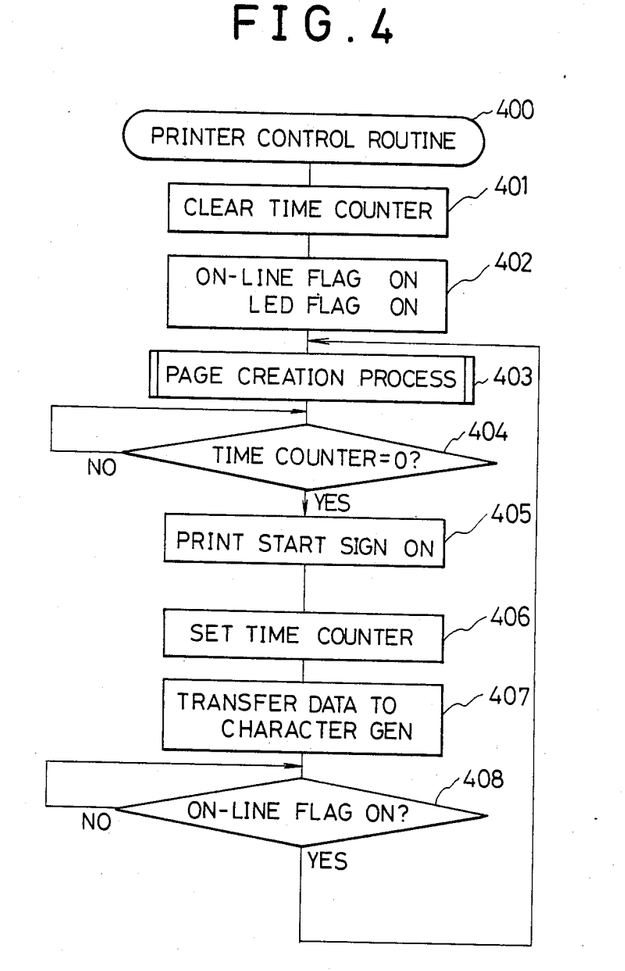
FIG. 4 is a control flow chart of the printer control unit of FIG. 2.

A control to display a transient status before the LBP 100 is temporarily stopped now will be explained with reference to the control program flow charts of the CPU 200 shown in FIGS. 4 to 8. FIG. 4 shows a main routine 400 for printer control. Steps 401 and 402 are initialization steps at the power-on of the LBP 100. In step 401, the time counter 206 is cleared, and in step 402, work flags to be used in the program are initialized. The work flags include an on-line flag which indicates the temporary stop/restart state of the LBP 100 and an LED flag which indicates the ON/OFF state of the on-line LED. When the on-line flag is ON, it indicates the restart state of the LBP 100, and when it is OFF, it indicates the temporary stop state. When the LED flag is ON, it indicates the ON state of the on-line LED 209, and when it is OFF, it indicates the OFF state of the on-line LED 209. The flags are initially set to ON in step 402. Thus, at the initial state, the data supplied from the host computer can be printed without any restriction. In a step 403, the input data from the host computer is edited into one page of data segmented by line and it is stored in the page buffer 203. At the end of the creation of the page, the time counter 206 is checked in a step 404. In the first print cycle, the content of the time counter 206 is zero. However, the content of the time counter 206 may not be zero at this step in or after the second continuous print cycle. It indicates that the paper on which the previous page was printed has not yet been ejected to the paper eject tray 113. In this case, the operation is deferred until the content of the time counter 206 reaches zero, that is, until the previous page paper is completely ejected. When the ejection of the previous page of paper is detected, a step 405 is started to supply the print start signal S04 to the output interface circuit 212 to start the printer units for the next print. In a step 406, a time period between the paper feed and the paper ejection, which is determined by the length of the paper conveyance path and the conveyance speed (constant), into the time counter 206 as a multiple of 100 ms—unit. In a step 407, the data stored in the page buffer 203 is sent to the character generator 210 to print it on the electrostatic drum 106. At the end of the transmission of one page of data, a step 408 is started to check the on-line flag in order to check if the on-line switch 208 has been depressed or not, that is, if the temporary stop request has been issued or not. If the on-line flag is OFF, that is, the temporary stop request has been issued, the next print cycle is not effected but deferred until the flag is changed to the ON state. The sensing of the on-line switch 208 and the setting/resetting of the on-line flag are carried out in a timer interrupt routine 800 which is started at a predetermined interval, as will be described later. If the on-line flag is ON, that is, in the restart state, the process returns to the step 403 to print the next page.

Figure 5A:
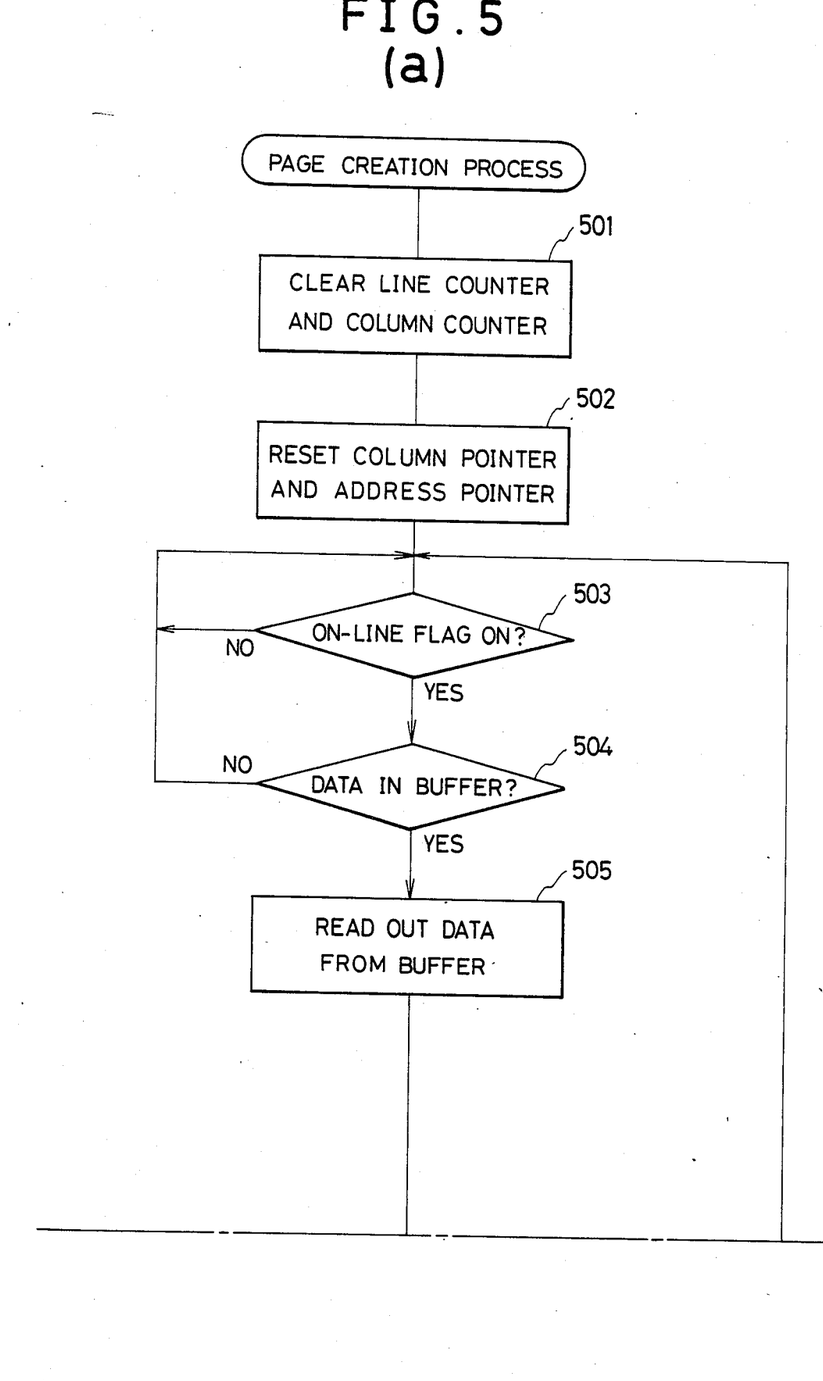
FIG. 5 is a diagram of the relationship between FIGS. 5(a) and 5(b) which show a flow chart of a page creation routine of FIG. 4.
Figure 5B:
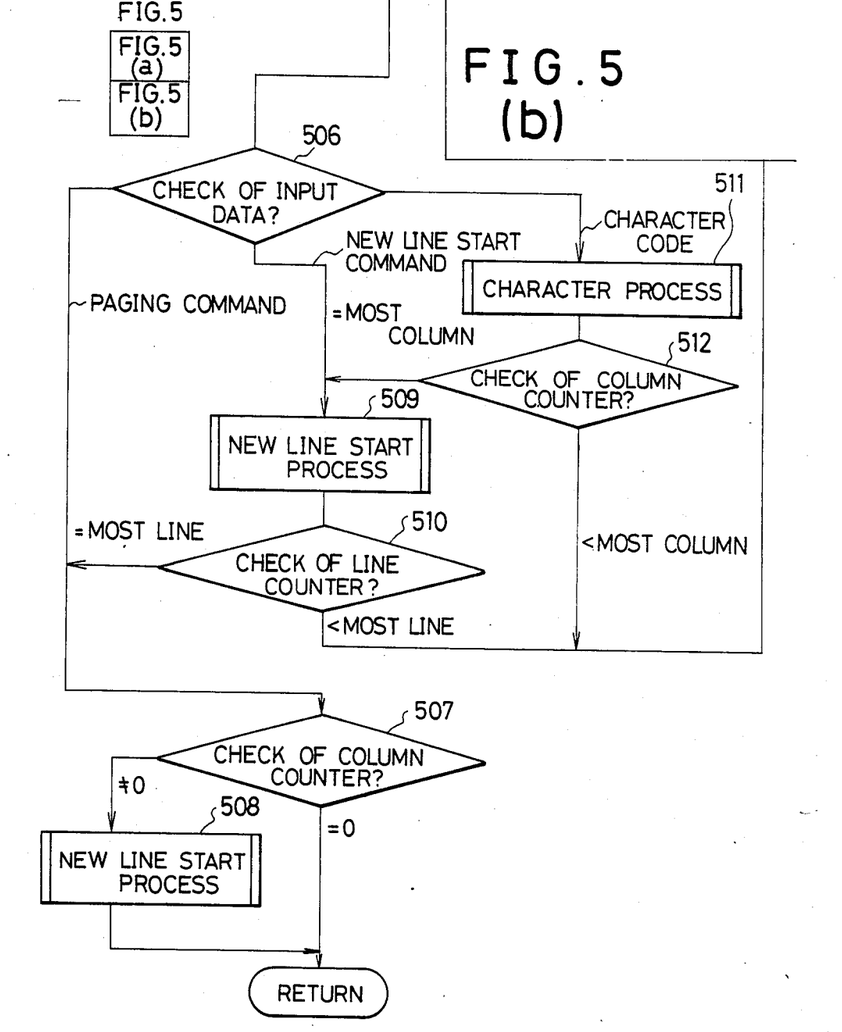

FIG. 5 shows a page creation routine in the step 403 of FIG. 4. As an initial process for creating a page, the line counter 204 and the column counter 205 are cleared in a step 501, and in a step 502, a start address of the page buffer 203 is set into the column pointer 300 of the page buffer 203 and the start address+1 is set into the address pointer 301. In a step 503, the on-line flag is checked to determine if the temporary stop is requested or not. If the temporary stop is requested (on-line is OFF), the printer waits for the restart state. If the on-line is ON, a step 504 is started to determine if the input data from the host computer has been stored in the reception buffer 202. If the input data has not been stored, the steps 503 and 504 are repeated and the on-line flag is checked until the input data is received. If the input data has been stored in the reception buffer 202, a step 505 is started to read out the input data from the reception buffer 202, and the type of the input data is checked in a step 506. If the input data is paging command, a step 507 is started to check the column counter 205. If the content of the column counter 205 is not zero, a line space process 600 is carried out in a step 508 and then the page creation process 500 is terminated. Since the page buffer 203 has been previously cleared and the print mode is the cut sheet print mode, the paging process is completed. If the input data is a line space command in the step 506, a line space command 600 is carried out in a step 509. In a step 510, the content of the line counter 204 is compared with a maximum number of lines which is determined by the paper length and the size of the character pattern in the font memory 211, and if they are equal, it means that the maximum number of lines has been reached and the step 507 is started to carry out the same process as that done for the paging command. If the content of the line counter 204 is not equal to the maximum number of lines, the next input data is read in the step 503. If the input data is the character code in the step 506, a step 511 is started to carry out a character process 700. In a step 512, the content of the columns counter 205 is compared with a maximum number of columns which is determined by paper width and the size of the character pattern in the font memory 211. If they are equal, the line space process is carried out in a step 509. If they are not equal, the next input data is read in the step 503.

Figure 6:
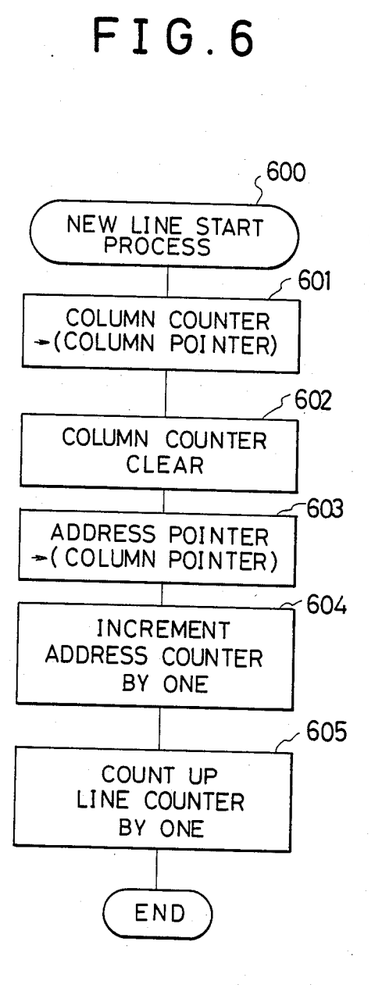
FIG. 6 is a flow chart of a line space routine of FIG. 5.

FIG. 6 shows a flow chart of the line space routine 600. In a step 601, the current content of the column counter 205 is stored into a digit data storage location for that line on the page buffer 203 pointed to by the column pointer 300. In a step 602, the column counter 205 is cleared. In a step 603, the column pointer 300 is updated by the current content of the address pointer 301. In a step 604, the address pointer 301 is incremented by one. In a step 605, the line counter 204 is incremented by one and the line space process is terminated.

Figure 7:
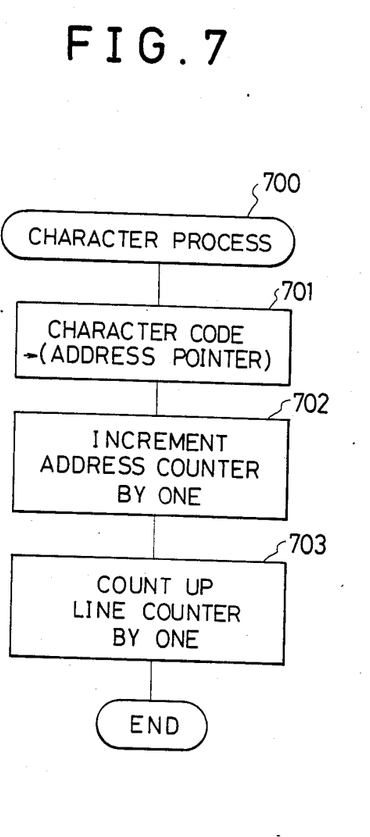
FIG. 7 is a flow chart of a character processing routine of FIG. 5.

FIG. 7 shows a flow chart of the character processing routine. In a step 701, the input character code is stored in a location on the page buffer 203 pointed to by the address pointer 301. In a step 702, the address pointer 301 is incremented by one, and in a step 703, the column counter 205 is incremented by one.

Figure 8:
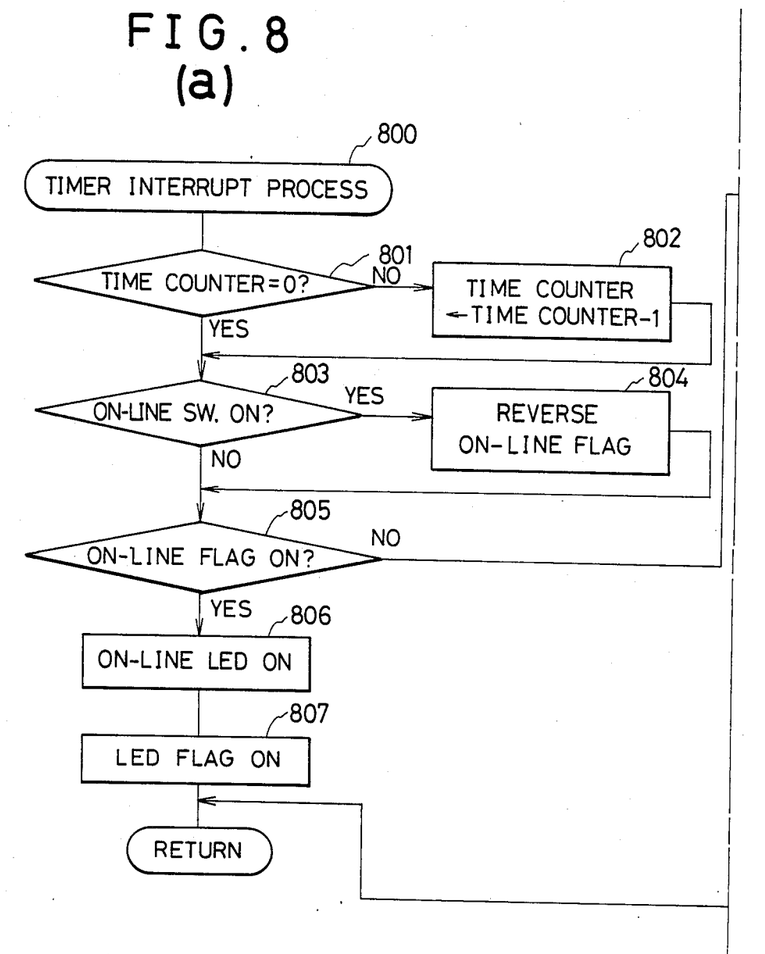
FIG. 8 is a diagram of the relationship between FIGS. 8(a) and 8(b) which show a flow chart of a timer interrupt routine.
Figure 8B:
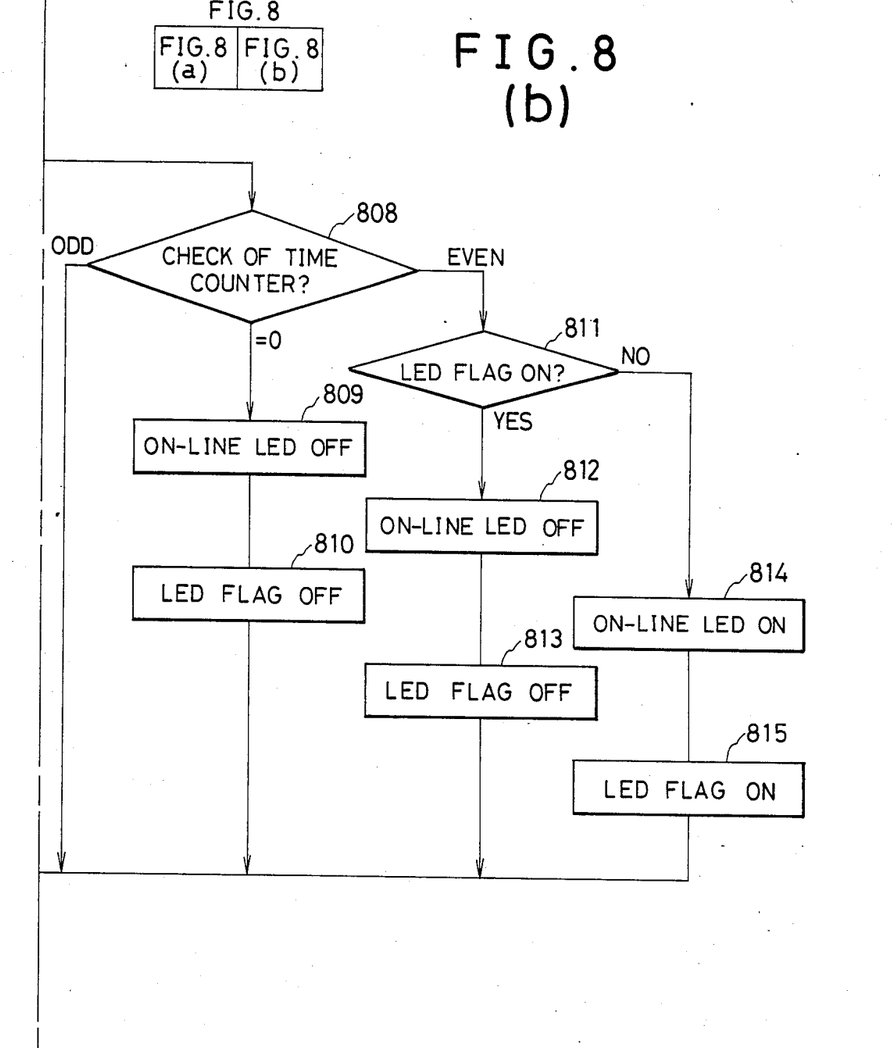

FIG. 8 shows a flow chart of the timer interrupt routine. The timer interrupt routine 800 is started by the interrupt signal S02 from the timer unit 207 at an interval of 100 ms independently from the printer control routine 400 which is the main program. In a step 801, the time counter 206 is checked. If the content of the time counter 206 is not zero, it indicates that a paper is being fed into the LBP 100 and the flow proceeds to a step 802 to decrement the time counter 206 by one. In a step 803, the state of on-line switch 208 is sensed, and if it is ON, the flow proceeds to a step 804 to invert the ON/OFF state of the on-line flag to store the state of the depressed on-line switch 208. In steps 805 et seq., ON, OFF and flashing states of the on-line LED 209 are controlled. In a step 805, the on-line flag is checked. If it is in the ON state or the restart state, the on-line LED 209 is turned on in a step 806 and the LED flag is set in a step 807. If the on-line flag is OFF or the temporary stop state in the step 805, the time counter 206 is checked in a step 808 to check if the paper is being fed. If the content of the time counter is zero, it indicates that the paper feed has been completed. Thus, the on-line LED 209 is turned off in a step 809 and the LED flag is reset in a step 810. Thus, the temporary stop state of the LBP 100 is indicated. Then, the timer interrupt process is terminated. If the content of the time counter 206 is not zero, it indicates that the paper is being fed. Accordingly, the on-line LED 209 is flashed to indicate that the temporary stop request has been accepted but the printer cannot be temporarily stopped until the paper is ejected. In order to flash the on-line LED 209 at an interval of 400 ms, it is turned on and off when the content of the time counter 206 is even, that is, at every other timer interruption. In a step 811, the LED flag is checked to confirm the ON/OFF state of the on-line LED 209. If it is ON, the on-line LED 209 is turned off in a step 812 and the LED flag is reset in a step 813. If the LED flag is OFF in the step 811, the on-line LED 209 is turned on in a step 814 and the LED flag is set in a step 815.

In this manner, whether or not the LBP 100 is in the print operation is monitored by the means for counting the conveyance time of the paper and it is checked when the temporary stop request is issued so that the transient status to the temporary stop is recognized. The LED is flashed during this period to inform the operator.

While the laser beam printer is shown and described in the above embodiment, the present invention is not limited to the LBP but it can be applied to other printers such as an LED printer and an OFT (optical fiber tube) printer.

In the above embodiment, the transient status to the temporary stop is indicated by flashing the LED. Alternatively, a buzzer or other alarm device may be used. Lock mechanisms may be provided on doors of the printer so that areas of the printer which may possibly be operated incorrectly are locked or unlocked in accordance with the display timing of the transient status to the temporary stop.

In the above embodiment, the page buffer and the time counter are adopted to process one page of data. By providing a plurality of page buffers and time counters, high speed continuous printing can be attained. This allows a high speed continuous print operation particularly when the conveyance path from the image forming unit to the paper ejection port is long such as in the electrostatic drum system. The present invention is effective in such an application.

In the above embodiment, whether or not the print operation is in progress is determined by the timer. Alternatively, a light sensor may be arranged in the paper conveyance path to detect whether or not the paper is in the conveyance path to determine whether or not the print operation is in progress.

When a plural-page buffer memory is used, the buffer area which is being used for printing at the time of the temporary stop request continues to output the data until the complete data is outputted, but the data of all other buffer areas are not outputted. In this manner, the printer can be stopped faster after the temporary stop request. It is similar to the operation in which the outputting of the reception buffer 202 is inhibited after the outputting of the page buffer 203. When the print operation is restarted, the data in the blocked page buffer areas are processed and printed. The same operation is applicable to a printer having a plurality of page buffers.

Alternatively, in the printer having a plurality of page buffer memories if a plurality of papers has already been fed out of the paper cassette at the time of the temporary stop, the data of those page buffer memories for those papers are continuously outputted, and after the outputting of those data, the outputting of further data is inhibited. When the print operation is restarted, the data is outputted from the next buffer. In this manner, the ejection of non-print paper is avoided. This can be attained by providing as many time counters 206 of FIG. 2 as the number of papers and effecting the similar processing and indication to those shown in the steps 808 et seq. of FIG. 8, and the checking the on-line flag of FIG. 4 (step 408) after page buffers equal in number to the number of papers have outputted the data.

The present invention is particularly effective to the electrophotographic printer and it is also applicable to other printers and a sorter for sorting recording papers.

What is claimed is:

1. A printer comprising:
   feed means for feeding a printing medium through the printer;
   print means for printing on the printing medium fed by said feed means;
   memory means for storing data and for supplying the data to said print means in blocks of one page at a time;
   input means for inputting a temporary stop request to the printer; and
   control means responsive to a temporary stop request occurring during the printing operation for continuing data output from said memory means for a single page until the printing operation of the recording medium being printed already fed is completed, and thereafter inhibiting further data output and stopping the operation of the printer after the recording medium has been ejected.

2. A printer according to claim 1 further comprising display means associated with the data access of said memory means for indicating ejection time of the printing medium.

3. A print system comprising:
   print means for printing on a printing medium;
   memory means for storing data and for supplying the data to said printing means in units of one page at a time;
   input means for inputting a temporary stop request to the print system; and
   display means for displaying the time necessary to eject the printing medium after completion of the print operation, wherein said display means cooperates with the data access of said memory means.

4. A printer comprising:
   feed means for feeding a printing medium;
   print means for printing on the printing medium fed by said feed means;
   memory means for storing data and for supplying the data to said print means in blocks of one page at a time;
   input means for inputting a temporary stop request to the printer; and
   control means responsive to the temporary stop request during the printing operation for controlling the data access, wherein the control process relating to a stop request for data which is accessed during the printing process is different from a stop request for data which is accessed during the reading process.

5. A printer according to claim 4, wherein said control means controls the data access so that data division for printing data is different from data division for reading data.

6. A printer according to claim 4, wherein said control means controls the data so that data division for printing data is different from data division for reading data.

* * * * *

UNITED STATES PATENT AND TRADEMARK OFFICE
CERTIFICATE OF CORRECTION

PATENT NO. : 4,673,990
DATED : June 16, 1987
INVENTOR(S) : Kunio Okada

Page 1 of 2

It is certified that error appears in the above-identified patent and that said Letters Patent is hereby corrected as shown below:

COLUMN 1

Line 18, "takes" should read --take--.
    Line 18, "According," should read --Accordingly--.
    Line 19, "printed" should read --print--.
    Line 34, "preferably" should read --preferable--.
    Line 48, "ivention" should read --invention--.
    Line 58, "a convey" should read
             --the conveyance--.

COLUMN 2

Line 29, "which accessed" should read
             --which is accessed--.

COLUMN 4

Line 49, "paper" should read --of paper--.
    Line 54, delete "which"
    Line 61, "check" (second occurrence) should read
             --determine--.

COLUMN 5

Line 44, "columns" should read --column--.

UNITED STATES PATENT AND TRADEMARK OFFICE
CERTIFICATE OF CORRECTION

PATENT NO. : 4,673,990
DATED : June 16, 1987
INVENTOR(S) : Kunio Okada

Page 2 of 2

It is certified that error appears in the above-identified patent and that said Letters Patent is hereby corrected as shown below:

COLUMN 5

Line 44, "columns" should read -- column --.

Signed and Sealed this

Twenty-ninth Day of September, 1987

Attest:

DONALD J. QUIGG

Attesting Officer     Commissioner of Patents and Trademarks